(12) United States Patent
Kamoto et al.

(10) Patent No.: US 8,533,756 B2
(45) Date of Patent: Sep. 10, 2013

(54) DISTRIBUTION DEVICE, DISTRIBUTION METHOD, AND COMPUTER PROGRAM

(75) Inventors: Satoru Kamoto, Kanagawa (JP); Yasuhiro Yamada, Tokyo (JP)

(73) Assignee: Sony Corporation (JP)

( * ) Notice: Subject to any disclaimer, the term of this patent is extended or adjusted under 35 U.S.C. 154(b) by 652 days.

(21) Appl. No.: 12/448,296

(22) PCT Filed: Nov. 28, 2007

(86) PCT No.: PCT/JP2007/072941
§ 371 (c)(1),
(2), (4) Date: Jun. 15, 2009

(87) PCT Pub. No.: WO2008/075543
PCT Pub. Date: Jun. 26, 2008

(65) Prior Publication Data
US 2009/0287770 A1 Nov. 19, 2009

(30) Foreign Application Priority Data
Dec. 18, 2006 (JP) ................................. 2006-340236

(51) Int. Cl.
*G06F 3/00* (2006.01)
(52) U.S. Cl.
USPC .............................. 725/39; 709/225; 370/310
(58) Field of Classification Search
USPC .......................................................... 709/203
See application file for complete search history.

(56) References Cited

U.S. PATENT DOCUMENTS 6,493,321 B1 * 12/2002 Partridge, III ................ 370/242
7,461,147 B1 * 12/2008 Mowat et al. ................. 709/225
2001/0034788 A1 * 10/2001 McTernan et al. ............ 709/232
(Continued)

FOREIGN PATENT DOCUMENTS

JP 2002152197 A 5/2002
JP 2002-298025 A 10/2002
(Continued)

OTHER PUBLICATIONS

Office Action from Japanese Application No. 2006-340236, dated Aug. 30, 2011.
(Continued)

*Primary Examiner* — Hamza Algibhah
(74) *Attorney, Agent, or Firm* — Lerner, David, Littenberg, Krumholz & Mentlik, LLP

(57) ABSTRACT

The present invention includes: a step of creating at least a play list including reproduction start times of the display terminal devices (1) and acquisition destination data indicating acquisition destinations of the creative data; and a step of transmitting the play list and the creative data to the display terminal devices (1) via the normal relay server devices (30) and the super relay server devices (20). The play list creating step creates the play list by determining the acquisition destination data in such a manner that the creative data is distributed preferentially to the super relay server devices (20) rather than to the normal relay server devices (30) and that the normal relay server devices (30) acquire the creative data from the super relay server devices (20). Because of this, the load on distribution devices for distributing creative data is reduced.

17 Claims, 4 Drawing Sheets

(56) References Cited

U.S. PATENT DOCUMENTS

| | | | |
|---|---|---|---|
| 2002/0026511 A1 | 2/2002 | Garcia-Luna-Aceves et al. | |
| 2005/0022235 A1 | 1/2005 | Davis | |
| 2006/0045110 A1* | 3/2006 | Miura et al. | 370/408 |
| 2006/0056324 A1* | 3/2006 | Hyyppa et al. | 370/310 |
| 2007/0130023 A1* | 6/2007 | Wolinsky et al. | 705/26 |
| 2007/0130314 A1* | 6/2007 | Hibino et al. | 709/223 |
| 2008/0040482 A1* | 2/2008 | Twiss et al. | 709/226 |
| 2008/0046599 A1* | 2/2008 | Hutson et al. | 710/1 |
| 2009/0013083 A9* | 1/2009 | Garcia-Luna-Aceves et al. | 709/229 |
| 2010/0036949 A1* | 2/2010 | Li et al. | 709/225 |
| 2011/0173521 A1* | 7/2011 | Horton et al. | 715/202 |

FOREIGN PATENT DOCUMENTS

| | | |
|---|---|---|
| JP | 2003-030078 A | 1/2003 |
| JP | 2004304698 A | 10/2004 |
| JP | 2005-184323 A | 7/2005 |
| JP | 2006-067077 A | 3/2006 |
| WO | 99004345 A1 | 1/1999 |
| WO | 99017227 A1 | 4/1999 |

OTHER PUBLICATIONS

Akihiro Sakai, et al. , "The Design and Implimentation of Caching System Based on Stream Control", Information Processing Society of Japan Kenkyu Hokoku, vol. 98, No. 15, IPSJ SIG Notes, Feb. 26, 1998, vol. 98, No. 15, pp. 173-178.

Hiroshi Yokota, et al., "A Proposed of DNS Filter Method to Select Suitable Mirror Servers for Clients and Its Implementation", Transactions of Information Processing Society of Japan, vol. 44, No. 3, IPSJ Journal, Mar. 15, 2003, vol. 44, No. 3, pp. 682-691.

Schaffa F et al: "On Bandwidth and Storage Tradeoffs in Multimedia Distribution Networks" Proceedings of Infocom '95 Conference on Computer Communications. Fourteenth Annual Joint Conference of the IEEE Computer and Communications Societies, Boston Apr. 26, 1995 vol. 3, Apr. 2, 1995, pp. 1020-1026, XP 000580521.

Zhang L et al: "Adaptive Web Caching", Internet Citation, Apr. 25, 1997 XP002232787.pp. 1-9.

Supplementary European Search Report EP 07832663, dated Dec. 1, 2011.

* cited by examiner

FIG. 2

```
<playlist>
<timestamp date="2006-02-28 20:45:24" />
<scene start="2006-03-01 09:13:30" end="2006-03-01 09:14:00">
<content>
http://aaa.co.jp/contents/content1
</content>
<scene start="2006-03-01 09:14:00" end="2006-03-01 09:14:30">
<content>
http://bbb.co.jp/contents/content2
</content>
<scene start="2006-03-01 09:15:00" end="2006-03-01 09:15:30">
<content>
http://ccc.co.jp/contents/content3
</content>
</playlist>
```

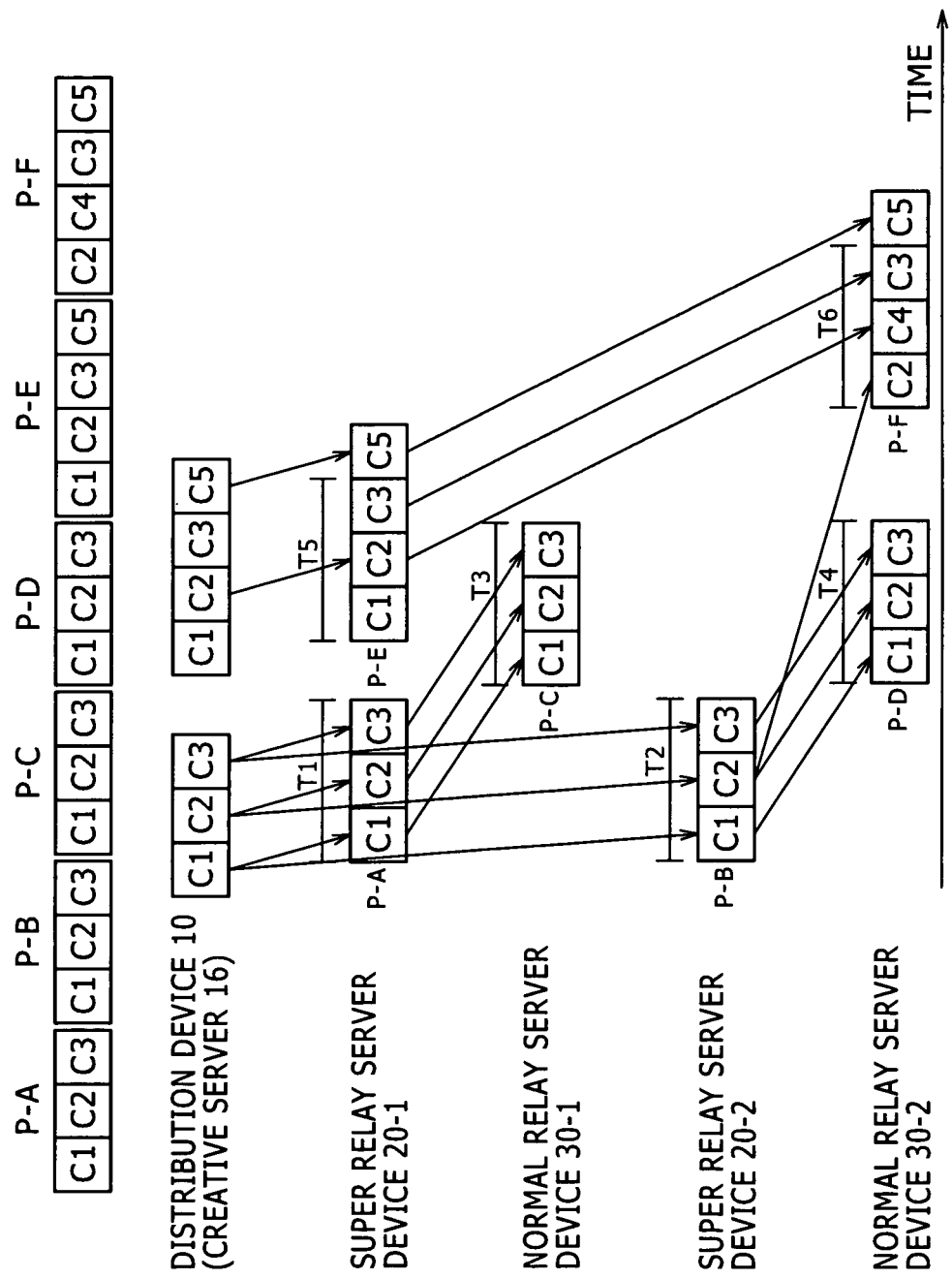

DISTRIBUTION DEVICE, DISTRIBUTION METHOD, AND COMPUTER PROGRAM

CROSS-REFERENCES TO RELATED APPLICATIONS

The present application is a national phase entry under 35 U.S.C. §371 of International Application No. PCT/JP2007/072941 filed Nov. 28, 2007, published on Jun. 26, 2008 as WO 2008/075543 A1, which claims priority from Japanese Patent Application No. JP 2006-340236 filed in the Japanese Patent Office on Dec. 18, 2006 the contents of which are incorporated herein by reference.

BACKGROUND OF THE INVENTION

1. Technical Field

The present invention relates to a distribution device, a distribution method, and a computer program for distributing creative data such as advertisement data to display terminal devices via relay server devices.

2. Background Art

At such places as train stations, public squares and lobbies where many people gather, display devices are seen set up for publicity purposes. This type of display device displays in moving or still pictures advertisement data created illustratively by advertising agencies. The advertisements displayed on such display devices are presented unilaterally to viewers. Even if a viewer wishes to know details about a product being advertised, it is impossible for that viewer to know them on the spot. Advertisers, for their part, are unable to ascertain the effects of the advertisements they have displayed on the display device installed at a given place. In particular, the advertisers are incapable of associating specific places where display devices are installed with the effects of the advertisements being run there.

The advertisement data displayed by such display devices is often distributed by distribution servers over networks. However, if too many demands come from numerous display devices seeking to acquire advertisement data, there can be too much load on the distribution servers distributing the advertisement data. This can make it impossible for the distribution servers to distribute advertisement data on time. Meanwhile, this application is related to Japanese Patent Laid-Open No. 2002-298025.

SUMMARY OF THE INVENTION

Technical Problem

The present invention has been devised in order to solve the aforementioned problems and its object is to provide a distribution device, a distribution method, and a computer program for distributing creative data such as advertisement data to display terminal devices on time while reducing the load on distribution devices for distributing such creative data.

A distribution device of the present invention distributes creative data to display terminal devices via relay server devices so that the display terminal devices may reproduce the creative data.

Here, the relay server devices are made up of normal relay server devices and super relay server devices, the normal relay server devices being capable of distributing the creative data to the display terminal devices and incapable of relaying the creative data to the other relay server devices, the super relay server devices being capable of distributing the creative data to the display terminal devices and to the other relay server devices.

And the distribution device of the present invention includes: storage means for storing a plurality of the creative data; schedule means for creating at least a play list including reproduction start times of the display terminal devices and acquisition destination data indicating acquisition destinations of the creative data; and communication means for transmitting the play list and the creative data to the display terminal devices via the normal relay server devices and the super relay server devices. And the schedule means creates the play list by determining the acquisition destination data in such a manner that the creative data is distributed preferentially to the super relay server devices rather than to the normal relay server devices and that the normal relay server devices acquire the creative data from the super relay server devices.

Also, a distribution method of the present invention includes: a step of creating at least a play list including reproduction start times of the display terminal devices and acquisition destination data indicating acquisition destinations of the creative data; and a step of transmitting the play list and the creative data to the display terminal devices via the normal relay server devices and the super relay server devices. And the play list creating step creates the play list by determining the acquisition destination data in such a manner that the creative data is distributed preferentially to the super relay server devices rather than to the normal relay server devices and that the normal relay server devices acquire the creative data from the super relay server devices.

Furthermore, the present invention provides a computer program for causing a computer to perform the above-described method.

According to the present invention, the creative data is distributed preferentially to the super relay server devices rather than to the normal relay server devices, and the normal relay server devices acquire the creative data from the super relay server devices. This reduces the load incurred when the creative data is distributed.

BRIEF DESCRIPTION OF THE DRAWINGS

FIG. 2 shows a play list.

FIG. 4 shows a typical setup in which creative data is distributed according to the present invention.

DETAILED DESCRIPTION

Best Mode for Carrying Out the Invention

Explained below in reference to the drawings is a distribution system of advertisement data to which the present invention is applied.

Figure 1:
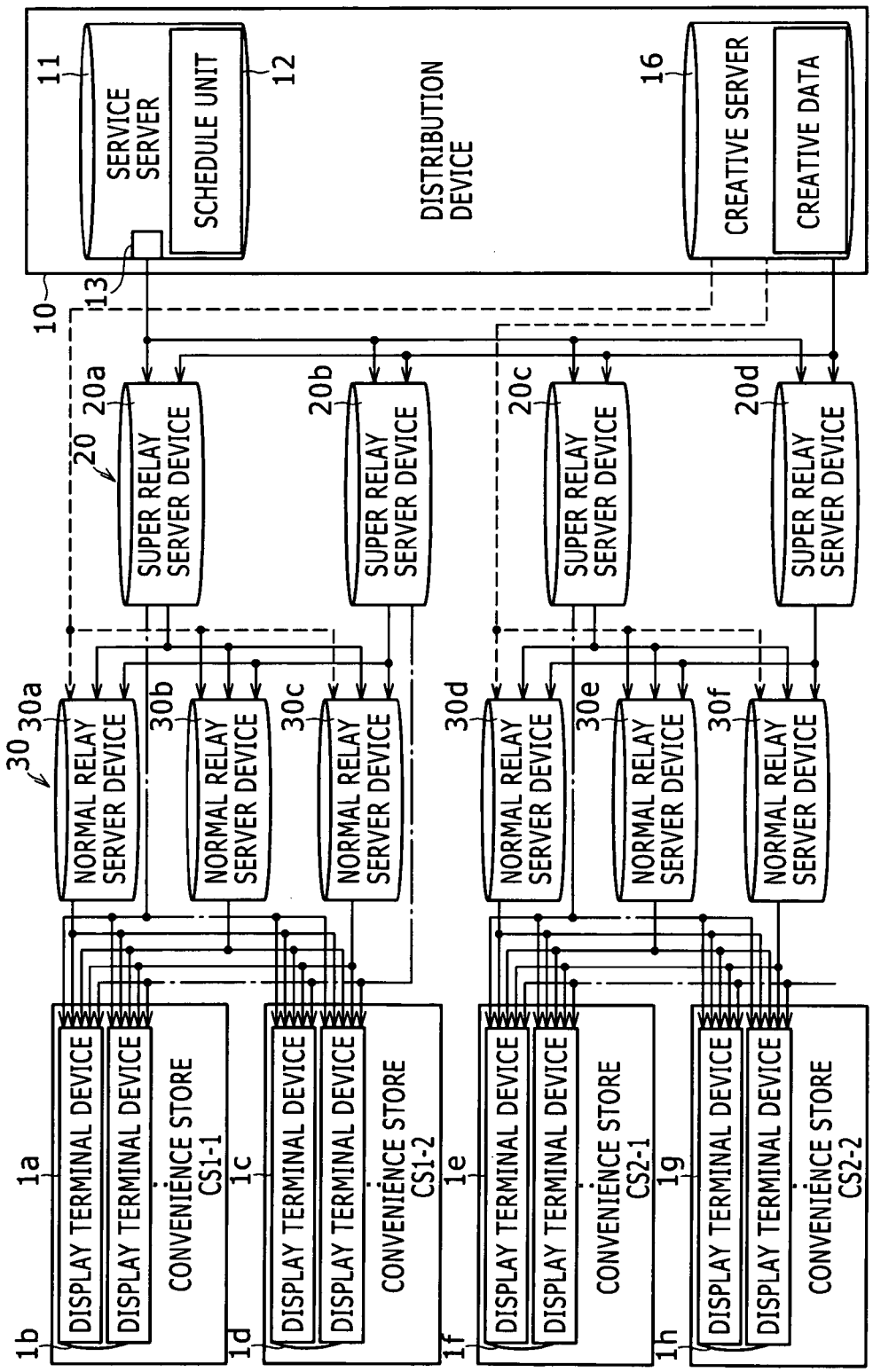
FIG. 1 shows a configuration of a distribution system to which the present invention is applied.

As shown in FIG. 1, the distribution system adopting the present invention is a system in which a distribution device 10 distributes advertisement data to display terminal devices 1a, 1b, 1c, 1d, 1e, 1f, 1g, 1h (simply called the display terminal devices 1 as well hereunder) set up at convenience stores CS1-1, CS1-2, CS2-1, CS2-2, etc., via super relay server devices 20 and normal relay server devices 30 over a network.

Here, the convenience stores CS1-1 and CS1-2 are illustratively franchisees belonging to the same franchise chain. Thus the display terminal devices 1a, 1b set up at the convenience store CS1-1 reproduce approximately the same advertisement data as the display terminal devices 1c, 1d set up at the convenience store CS1-2.

And the convenience stores CS2-1 and CS2-2 are illustratively stores belonging to franchise chain different from the franchise chain to which the above-described convenience stores CS1-1 and CS1-2 belongs, and franchisees, respectively. Thus the display terminal devices 1e, 1f set up at the convenience store CS2-1 reproduce approximately the same advertisement data as the display terminal devices 1g, 1h set up at the convenience store CS2-2; this advertisement data is different from that reproduced at the convenience stores CS1-1 and CS1-2.

The distribution device 10 manages collectively the advertisement data to be distributed to the display terminal devices 1 via the super relay server devices 20 and normal relay server devices 30 on the network, the distribution device 10 distributing predetermined advertisement data to the individual display terminal devices 1.

Here, advertisement data is formed as a collection of creative data formed by moving pictures and audio data for advertising individual products and services. The advertisement data is reproduced by display terminal devices 1 in a temporally continuous manner.

The distribution device 10 used in such a distribution system has a service server 11 which creates distribution schedules for distributing predetermined advertisement data to the display terminal devices 1 via the super relay server devices 20 and normal relay server devices 30; and a creative server 16 which stores a plurality of creative data forming the advertisement data.

The service server 11 is typically constituted by software and hardware. The service server 11 has a schedule unit 12 which creates play lists by devising schedules for the creative data; and a communication unit 13 which distributes the play lists to the super relay server devices 20 and normal relay server devices 30 subordinate to the communication unit 13.

The schedule unit 12 creates play lists dynamically, i.e., in keeping with the network environment currently in effect, for the super relay server devices 20, normal relay server devices 30, and display terminal devices 1 subordinate to the schedule unit 12. Each play list is destined for one of the display terminal devices 1. For example, as shown in FIG. 2, the play list describes a scene start time representing a reproduction start time and a scene end time representing a reproduction end time regarding each of the creative data, and the location (URL: Uniform Resource Locator) of the creative data in question. The URL used here typically includes a scheme name "http," a server name "//www.aaa.co.jp," and a folder name "contents" or the like, ending with a file name "content1." Illustratively, the URL is defined so that if creative data cached in different server devices has the same file name, then the creative data constitutes the same data. The URLs denote the acquisition destinations of creative data, the acquisition destinations being described in a manner dispersed among the super relay server devices 20 and normal relay server devices 30.

Meanwhile, the scene start times and scene end times are input to the schedule unit 12 regarding each of the creative data based on program schedules.

The schedule unit 12 creates these play lists by dynamically changing the URLs of which the default is set for the creative server 16, in such a manner as to disperse the load on the super relay server devices 20 and normal relay server devices 30 in consideration of whether the reproduction star time of each of the creative data and the creative data in question are cached in the super relay server devices 20 and how much load is placed on the super relay server devices 20. Whereas the URLs in the play list are dynamically changed, the files named in the URLs are furnished with the creative data of the same content if the names are the same. In this case, even if a path before the file names is changed, the desired creative data is always distributed to the display terminal devices 1.

The communication unit 13, together with the schedule unit 12 which creates play lists by forming schedules for creative data, distributes the play lists to the super relay server devices 20 and normal relay server devices 30 subordinate to the schedule unit 12. And the communication unit 13 checks communication status, load status (e.g., number of connections×data quantity), and defect status of the super relay server devices 20; and outputs the checked communication status to the schedule unit 12 so that the schedule unit 12 may create play lists by referencing the communication status of the super relay server devices 20. And the communication unit 13 performs a search for the creative data cached in the normal relay server devices 30 subordinate to the communication unit 13, and inputs the result of the search to the schedule unit 12 so that the schedule unit 12 may reference the search result when creating play lists.

The creative server 16 stores in a storage unit a plurality of creative data constituting the advertisement data to be reproduced by this distribution system. Upon distribution of play lists, the creative server 16 transmits the creative data as requested by the super relay server devices 20 and normal relay server devices 30.

The distribution device 10 structured as described above creates play lists in such a manner that creative data is distributed preferentially to the super relay server devices 20 rather than to the normal relay server devices 30.

Here, the normal relay server devices 30 are each incapable of relaying data to the other normal relay server devices, and are apparatuses to which only the display terminal devices can access. In the example of FIG. 1, the normal relay server devices 30a, 30b and 30c are subordinate to the super relay server devices 20a and 20b. For example, the normal relay server device 30a cannot connect to the other normal relay server device 30b through 30f. And the normal relay server devices 30d, 30e and 30f are subordinate to the super relay server devices 20c and 20d. For example, the normal relay server device 30d cannot connect to the other normal relay server devices 30e, 30f, and 30a through 30c. Meanwhile, the number of super relay server devices 20 for distributing advertisement data to the convenience stores CS belonging to the same franchise chain is not limited to the number in FIG. 1 or to any other specific number. Also the number of normal relay server devices 30 subordinate to the super relay server devices 20 is not limited to the number in FIG. 1 or to any other specific number. Also the number of the display terminal devices 1 at the convenience stores CS belonging to the same franchise chain is not limited to the number in the example of FIG. 1.

The super relay server devices 20 are capable of relaying creative data to the relay server devices 30. And the super relay server devices 20 are made up of connection-capable relay server devices, relay-capable server devices, and relay-determined server devices. These super relay server devices 20 are determined by software in terms of their policies for acting as the connection-capable relay server devices, relay-capable server devices, and relay-determined server devices which will be described next. In terms of hardware, the server relay server devices 20 are also superior to the normal relay server devices 30.

The connection-capable relay server devices are the super relay server devices enabled as connectable from the viewpoint of the normal relay server devices 30. In the example of FIG. 1, the super relay server devices 20a and 20b are the connection-capable relay server devices from the viewpoint of the normal relay server devices 30a, 30b and 30c; the super relay server devices 20c and 20d are not regarded as connection-capable relay server devices. The super relay server devices 20a and 20b are made to act as the connection-capable relay server devices for the normal relay server devices 30a and 30b because, with the normal relay server devices 30a and 30b connected to the display terminal devices 1a through 1d at the convenience stores CS1-1 and CS1-2 and subordinate to the super relay server devices 20a and 20b, management procedures would become complicated if the super relay server devices 20a and 20b were to be accessed by the normal relay server devices 30c and 30d connected to the display terminal devices 1e through 1h at the convenience stores CS2-1 and CS2-2 belonging to another franchise chain.

The relay-capable server devices are the super relay server devices 20 which act as the connection-capable relay server devices and which cache the creative data desired to be relayed from the viewpoint of the normal relay server devices 30. The relay-determined server devices are the super relay server devices 20 which, from the viewpoint of the normal relay server devices 30, actually relay creative data when selected from among the relay-capable server devices. The super relay server devices 20a and 20b can act as the relay-capable server devices and relay-determined server devices with regard to the chain of convenience stores CS1-1 and CS1-2 in FIG. 1.

In the distribution system described above, the above-mentioned schedule unit 12 makes the following decisions when determining the URL as the acquisition destination of given creative data in a play list:

1. The schedule unit 12 determines the URL in such a manner that creative data is distributed preferentially to the super relay server devices 20 rather than to the normal relay server devices 30 and that the normal relay server devices 30 acquire the creative data from the super relay server devices 20.

2. When the reproduction start time of the creative data falls below a predetermined time, the URL of the creative data is set for the creative server 16 and the creative data is distributed directly.

3. When the service server 11 transmits the play list, the schedule unit 12 performs a search to see if each of the creative data in the play list is cached in the super relay server devices 20. When the creative data is found to be cached, the data-caching super relay server devices 20 are selected as relay-capable server devices. In order to disperse the load, some of the relay-capable server devices are randomly selected as relay-determined server devices that actually relay creative data. The URL is set for the relay-determined server devices. Alternatively, the relay-determined server devices may be selected on a regular basis.

4. If the randomly selected relay-capable server devices are found to have been set already as the relay-determined server devices for other creative data, then the relay-capable server devices are selected as the relay-determined server devices for the creative data in question, and the URL is set for the same relay-determined server devices.

5. If the relay-capable server devices selected in the decision 3 above are found to have been designated by the display terminal devices 1 through 4 subordinate to these relay-capable server devices using the URL, then the relay-capable server devices are set as relay-determined server devices, and the URL is set for the same relay-determined server devices.

6. Upon start of the relaying of creative data, the super relay server devices 30 are checked for load levels. If the load is found to exceed a predetermined level, the URL of the creative data is set for the creative server 16 and the creative data is distributed directly.

7. If the normal relay server devices 30 cannot acquire creative data from the super relay server devices 20, then the URL of the creative data is set for the creative server 16 and the creative data is distributed directly.

Under the above-described rules, the distribution device 10 distributes play lists and creative data to the super relay server devices 20 and normal relay server devices 30 at the same time as, or at different times from, status checks or other exchanges performed periodically between the distribution device 10 on the one hand and the super relay server devices 20 and normal relay server devices 30 on the other hand. And the super relay server devices 20 and normal relay server devices 30 distribute the play lists and creative data to the display terminal devices 1 at the same time as, or at different times from, status checks or other exchanges performed periodically between the super relay server devices 20 and normal relay server devices 30 on the one hand and the display terminal devices 1 on the other hand.

Figure 3A:
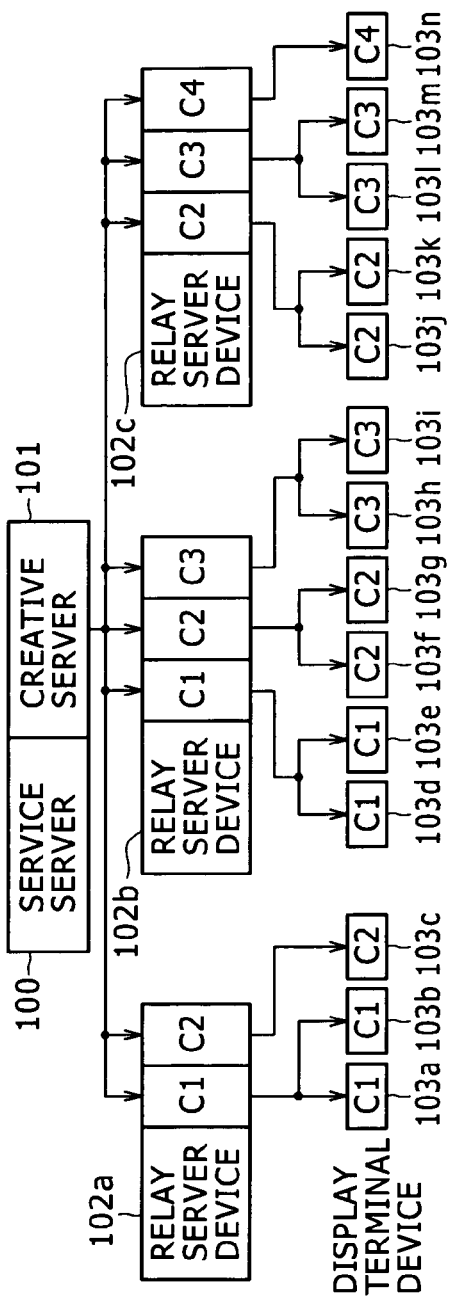
FIG. 3 shows typical setups in which creative data is distributed, FIG. 3A indicating a reference setup, FIG. 3B giving a setup to which the present invention is applied.
Figure 3B:
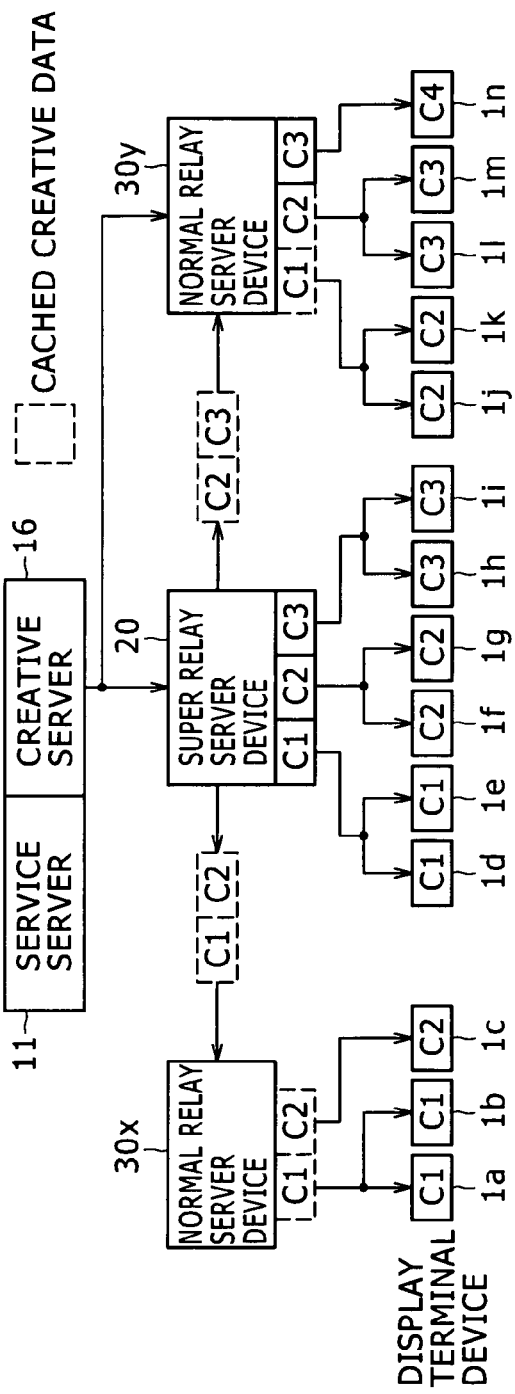

Here, FIG. 3A shows a reference setup in which a distribution system not using the super relay server devices 20 distributes creative data to the display terminal devices 1. In comparison with the reference setup, FIG. 3B shows a typical setup in which the distribution system adopting the present invention distributes creative data to the display terminal devices 1.

The reference setup shown in FIG. 3A is an example in which creative data C1 through C4 are distributed to display terminal devices 103a through 103n for creative data reproduction, as illustrated. In this example, a service server 100 causes a creative server 101 to distribute the creative data C1 through C4.

Specifically, the creative server 101 distributes the creative data C1 and C2 to a relay server device 102a; the creative data C1, C2 and C3 to a relay server device 102b; and the creative data C2, C3 and C4 to a relay server device 102c. And the relay server device 102a distributes the creative data C1 to the display terminal devices 103a and 103b and the creative data C2 to the display terminal device 103c. Also the relay server device 102b distributes the creative data C1 to the display terminal device 103d and 103e, the creative data C2 to the display terminal devices 103f and 103g, and the creative data C3 to the display terminal devices 103h and 103i. Furthermore, the relay server device 102c distributes the creative data C2 to the display terminal devices 103j and 103k, the creative data C3 to the display terminal devices 103l and 103m, and the creative data C4 to the display terminal device 103n.

That is, in the example of FIG. 3A, all types of creative data C to be reproduced by the display terminal devices 1 subordinate to the relay server devices 102a through 102c are cached in the relay server devices 102a through 102c. For example, the relay server device 102a caches the creative data C1, C2 because the creative data C1 and C2 are to be reproduced by the display terminal devices. As a result, in the setup of FIG. 3A, the creative server 101 distributes as many as "8" creative data to the relay server devices 103a through 103c.

By contrast, what follows is an explanation of how the distribution system adopting the present invention in FIG. 3B distributes creative data C1 through C4 to display terminal devices 1a through 1n as in the case of FIG. 3A.

Specifically, the creative server 16 distributes preferentially the creative data C1, C2 and C3 to a super relay server device 20 and the creative data C4 to a normal relay server device 30y. And the super relay server device 20 distributes the creative data C1 and C2 to a normal relay server device 30x so that the creative data C1 and C2 may be cached in the normal relay server device 30x, and distributes the creative data C2 and C3 to the normal relay server device 30y so that the creative data C2, C3 and C4 may be cached in the normal relay server device 30y.

Meanwhile, the creative data C1, C2 and C3 enclosed by dotted lines denote the data being cached in the super relay server device 20.

And in FIG. 3B, the normal relay server device 30x distributes the creative data C1 to the display terminal devices 1a and 1b and the creative data C2 to the display terminal device 1c. And the super relay server device 20 distributes the creative data C1 to the display terminal devices 1d and 1e, the creative data C2 to the display terminal devices 1f and 1g, and the creative data C3 to the display terminal devices 1h and 1i. Furthermore, the normal relay server device 30y distributes the creative data C2 to the display terminal devices 1j and 1k, the creative data C3 to the display terminal devices 1l and 1m, and the creative data C4 to the display terminal device 1n.

In the case of FIG. 3B, the creative server 16 distributes preferentially the creative data C1, C2 and C3 to the super relay server device 20 rather than to the normal relay server devices 30x and 30y, and distributes the creative data C4 only to the normal relay server device 30y. The super relay service device 20 transmits the creative data C1 and C2 to the normal relay server device 30x and the creative data C2 and C4 to the normal relay server device 30y.

In other words, the normal relay server device 30x to which the display terminal devices 1a through 1c are subordinated acquires the creative data C1 and C2 from the super relay server device 20 and does not access the creative server 16. And the normal relay server device 30y to which the display terminal devices 1j through in are subordinated acquires only the creative data C4 from the creative server 16, and acquires the creative data C2 and C3 from the super relay server device 20 (a case of the decision 1 above).

As a result, the number of creative data distributed by the creative server 16 to the super relay server 20 and relay server devices is brought to "4," which is half the number in the example of FIG. 3A. This makes it possible to reduce the number of data distributions to the super relay server devices 20.

In the example of FIG. 3B, if the display terminal device 1a is to acquire the creative data C1 from the super relay server device 20, then the display terminal device 1b may be arranged also to acquire the creative data C1 from the super relay server device 20. The play lists for these two devices may be provided with the same URL to permit acquisition of the creative data C1 along the same path (a case of the decision 5 above).

Furthermore, described below in reference to FIG. 4 is a method for distributing the creative data C in an example where the creative data C1 through C4 are distributed so as to let the display terminal devices 1 reproduce the creative data C1 through C4. The process in FIG. 4 is started when the service server 11 distributes play lists P. In the example of FIG. 4, play lists P-A, P-B, P-C, P-D, P-E and P-F are provided for six display terminal devices 1 respectively. In each play list P, the creative data C1 through C4 to be reproduced by the corresponding display terminal device 1 are arrayed in the chronological order of reproduction start time. And the service server 11 determines the URLs in the play lists P-A through P-F in such a manner that the creative data C1 through C4 will be distributed to the individual display terminal devices 1 as shown in FIG. 4.

And super relay server devices 20-1 and 20-2 act as connection-capable relay server devices. Depending on the time zone, these super relay server devices may be selected as relay-capable server devices from the connection-capable relay server devices and may eventually act as relay-determined server devices.

Specifically, in a first time zone T1, the creative server 16 distributes the creative data C1, C2 and C3 to the super relay server device 20-1 in order of reproduction start times according to the play list P-A. And in a second time zone T2 which is the same as or a little later than the first time zone T1, the creative server 16 distributes the creative data C1, C2 and C3 to the super relay server device 20-2 in order of reproduction start times according to the play list P-B. That is, the creative server 16 distributes the creative data C1, C2 and C3 to the super relay server devices 20-1 and 20-2 in the first and the second time zones T1 and T2 which are approximately the same.

Thus, when the display terminal devices 1 which reproduce advertisement data according to the play list P-A have the creative data C1, C2 and C3 distributed thereto by the super relay server device 20-1, these display terminal devices 1 can reproduce the creative data C1, C2 and C3. And when the display terminal devices 1 which reproduce advertisement data according to the play list P-B have the creative data C1, C2 and C3 distributed thereto by the super relay server device 20-2, these display terminal devices 1 can reproduce the creative data C1, C2 and C3.

And in a third time zone T3 which is later than the second time zone T2, the super relay server device 20-1 distributes the creative data C1, C2 and C3 to the normal relay server device 30-1 according to the play list P-C. And in a fourth time zone T4 which is approximately the same as the third time zone T3, the super relay server device 20-2 distributes the creative data C1, C2 and C3 to the normal relay server device 30-2 according to the play list P-D.

Thus, when the display terminal devices 1 which reproduce advertisement data according to the play list P-C have the creative data C1, C2 and C3 distributed thereto by the normal relay server device 30-1, these display terminal devices 1 can reproduce the creative data C1, C2 and C3. And when the display terminal devices 1 which reproduce advertisement data according to the play list P-D have the creative data C1, C2 and C3 distributed thereto by the normal relay server device 30-2, these display terminal devices 1 can reproduce the creative data C1, C2 and C3.

And in a fifth time zone T5 subsequent to the first time zone T1, the creative server 16 distributes the creative data C4 and C5 to the super relay server device 20-1 in order of reproduction start times according to the play list P-E. That is, before the play list P-E is distributed, the service server 11 checks the super relay server device 20-2 to detect that the creative data C2 and C3 were cached therein in the first time zone T1, and determines the super relay server device 20-2 as the relay-determined server device selected randomly from some of the relay-capable server devices (a case of the decision 3 above). Meanwhile, the creative data C2 and C3 enclosed by broken lines in the figure denote the cached creative data.

And in a sixth time zone T6 subsequent to the fifth time zone T5, the super relay server device 20-2 distributes the creative data C2 to the normal relay server device 30-2 according to the play list P-F. And the super relay server device 20-1 distributes the creative data C4, C3 and C5 to the normal relay server device 30-2 according to the play list P-F. Here, the creative data C2 is distributed to the normal relay server device 30-2 not by the super relay server device 20-1 but by the super relay server device 20-2 because, in the second time zone T2, the super relay server device 20-2 was already selected as the relay-determined server device for distributing the creative data C1 and C2 (a case of the decision 4 above).

Thus, when the display terminal devices 1 which reproduce advertisement data according to the play list P-E have the creative data C2, C4, C3 and C5 distributed thereto by the super relay server device 20-1, these display terminal devices 1 can reproduce the creative data C2, C4, C3 and C5. And when the display terminal devices 1 which reproduce advertisement data according to the play list P-F have the creative data C2, C4, C3 and C5 distributed thereto by the normal relay server device 30-2, these display terminal devices 1 can reproduce the creative data C2, C4, C3 and C5.

Meanwhile, although not shown in FIG. 4, if the scene start time of the creative data C to be distributed falls below a predetermined time, then the URL of the creative data in question is set for the creative server 16 and the creative data is distributed directly (a case of the decision 2 above).

Also, although not shown in FIG. 4, if the selected relay-capable server device is found to have been designated already by the display terminal devices 1 subordinate to the relay-capable server device in question, then the relay-capable server device is selected as the relay-determined server device so that the creative data will be distributed from there to the display terminal devices (a case of the decision 5 above).

Furthermore, although not shown in FIG. 4, when the distribution of creative data is to be started, the creative server 16 checks the super relay server devices 20 for load levels and, if the load is found to be equal to or exceed a predetermined level, then distributes the creative data directly by itself (a case of the decision 6 above).

Furthermore, although not shown in FIG. 4, if the normal relay server devices 30 cannot acquire creative data from the super relay server devices 20, then the normal relay server devices 30 distribute the creative data directly by themselves (a case of the decision 7 above).

According to the creative data distribution method using the distribution device 10 described above, creative data is distributed preferentially to the super relay server devices 20 rather than to the normal relay server devices 30 so that the normal relay server devices 30 may acquire the creative data from the super relay server devices 20. This reduces the load of the distribution device 10 including the service server 11 and creative server 16, and lowers the load of the super relay server devices 20 as well.

And when the reproduction start time of creative data falls below a predetermined time, the service server 11 creates a play list wherein the acquisition destination data of the creative data in question is set for an own device so that the creative server 16 will distribute the creative data directly. This permits reliable distribution of the creative data to the display terminal devices 1.

Furthermore, when play lists are to be transmitted, a search is performed to determine if the individual creative data in the play lists are cached in the super relay server devices 20. When the creative data are found to be cached, the cached data-caching super relay server devices 20 are selected as relay-capable server devices. Some of the relay-capable server devices are randomly selected as the relay-determined server devices for actually relaying the creative data. In this manner, the creative data C is distributed efficiently. If the selected relay-capable server device is found to have been selected already as the relay-determined server device for other creative data, then the relay-capable server device is selected as the relay-determined server device for the creative data in question. This makes it possible to constitute the same relay route for the creative data so that the creative data C can be distributed efficiently.

Furthermore, if the selected relay-capable server device is found to have been designated already by the display terminal devices 1 subordinate to the relay-capable server devices in question using URLs, then the relay-capable server device is selected as the relay-determined server device. This makes it possible to constitute the same relay route for the creative data so that the creative data C can be distributed efficiently.

Furthermore, the super relay server devices are checked for load levels. If the load is found to be excessive or if the normal relay server devices 30 cannot acquire creative data from the super relay server devices due to a failure or other irregularities, then the creative server 16 distributes the creative data directly. This permits reliable distribution of the creative data to the display terminal devices 1.

The invention claimed is:

1. A distribution device for distributing creative data to display terminal devices via relay server devices so that said display terminal devices may reproduce said creative data, wherein said relay server devices include normal relay server devices and super relay server devices, said normal relay server devices distributing said creative data to said display terminal devices and incapable of relaying said creative data to the other relay server devices, said super relay server devices distributing said creative data to said display terminal devices and to the other relay server devices; said distribution device comprising:

a storage unit that stores a plurality of said creative data;
a schedule unit that creates at least a play list for a given one of said display terminal devices, the play list including reproduction start times of said creative data of that play list and acquisition destination data indicating acquisition destinations of said creative data of that play list, the acquisition destinations being selected from the group consisting of said distribution device, said super relay server devices, and said normal relay server devices; and
a communication unit that transmits said play list and said creative data to said display terminal devices via said normal relay server devices and said super relay server devices;
wherein said schedule unit creates said play list by determining said acquisition destination data such that said creative data is distributed preferentially to said super relay server devices rather than to said normal relay server devices and said super relay server devices then distribute said creative data said normal relay server devices, and
when said reproduction start times of said creative data in the play list for the given one of said display terminal devices fall below a predetermined time, said schedule unit sets said acquisition destination data of said creative data for said distribution device and schedules said creative data to be distributed directly from said distribution device to the given display terminal device.

2. The distribution device according to claim 1, wherein upon transmission of said play list, said schedule unit performs a search to determine whether each of said creative data in said play list is cached in said super relay server devices and, if said creative data is found cached in said super relay server devices, selects said super relay service devices as relay-capable service devices, said schedule unit further selecting some of said relay-capable service devices as relay-determined server devices for actually relaying said creative data while setting said acquisition destination data for said relay-determined server devices.

3. The distribution device according to claim 2, wherein said schedule unit randomly selects said relay-determined server devices from said relay-capable server devices in which said creative data is cached and sets said acquisition destination data for said relay-determined service devices.

4. The distribution device according to claim 3, wherein if the selected relay-capable server devices are found to have been selected already as relay-determined server devices for other creative data, then said schedule unit selects the relay-capable server devices as relay-determined server devices for said creative data and sets said acquisition destination data for the same relay-determined service devices.

5. The distribution device according to claim 3, wherein if the selected relay-capable server devices are found to have been designated already as relay-determined server devices by said display terminal devices subordinate to the selected relay-capable server device using said acquisition destination data, then said schedule unit selects the relay-capable server devices as the relay-determined server devices and sets said acquisition destination data for the same relay-determined server devices.

6. The distribution device according to claim 1, wherein said schedule unit checks said super relay server devices for load levels upon start of distribution of said creative data and, if the load of said super relay server devices is found to have been equal to or exceeded a predetermined level, then sets said acquisition destination data of said creative data for an own device and schedules said creative data to be distributed directly.

7. The distribution device according to claim 1, wherein if said normal relay server devices are incapable of acquiring said creative data from said super relay server devices, then said schedule unit sets said acquisition destination data of said creative data for an own device and schedules said creative data to be distributed directly.

8. The distribution device according to claim 3, wherein if the selected relay-capable server devices are found to have been selected already as relay-determined server devices for at least some of the creative data of the play list, then said schedule unit selects the relay-capable server devices as relay-determined server devices for that creative data and sets said acquisition destination data for the same relay-determined service devices even though said schedule unit selects other relay-capable server devices as relay-determined server devices for other creative data of the play list.

9. A distribution method for distributing creative data to display terminal devices via relay server devices so that said display terminal devices may reproduce said creative data, wherein said relay server devices include normal relay server devices and super relay server devices, said normal relay server devices distributing said creative data to said display terminal devices and incapable of relaying said creative data to the other relay server devices, said super relay server devices distributing said creative data to said display terminal devices and to the other relay server devices; said distribution method comprising:

creating at least a play list for a given one of said display terminal devices, the play list including reproduction start times of said creative data of that play list and acquisition destination data indicating acquisition destinations of said creative data of that play list, the acquisition destinations being selected from the group consisting of said distribution device, said super relay server devices, and said normal relay server devices; and transmitting said play list and said creative data to said display terminal devices via said normal relay server devices and said super relay server devices;

wherein said play list creating step creates said play list by determining said acquisition destination data such that said creative data is distributed preferentially to said super relay server devices rather than to said normal relay server devices and said super relay server devices then distribute said creative data said normal relay server devices, and when said reproduction start times of said creative data in the play list for the given one of said display terminal devices fall below a predetermined time, said play list creating step sets said acquisition destination data of said creative data for said distribution device and schedules said creative data to be distributed directly from said distribution device to the given display terminal device.

10. The distribution method according to claim 9, wherein upon transmission of said play list, said play list creating step performs a search to determine whether each of said creative data in said play list is cached in said super relay server devices and, if said creative data is found cached, selects said cached super relay service devices as relay-capable service devices, said play list creating step further selecting some of said relay-capable service devices as relay-determined server devices for actually relaying said creative data while setting said acquisition destination data for said relay-determined server devices.

11. The distribution method according to claim 10, wherein said play list creating step randomly selects said relay-determined server devices from said relay-capable server devices and sets said acquisition destination data for said relay-determined service devices.

12. The distribution method according to claim 11, wherein if the selected relay-capable server devices are found to have been selected already as relay-determined server devices for other creative data, then said play list creating step selects the relay-capable server devices as relay-determined server devices for said creative data and sets said acquisition destination data for the same relay-determined service devices.

13. The distribution method according to claim 11, wherein if the selected relay-capable server devices are found to have been designated already as relay-determined server devices by said display terminal devices subordinate to the selected relay-capable server device using said acquisition destination data, then said play list creating step selects the relay-capable server devices as the relay-determined server devices and sets said acquisition destination data for the same relay-determined server devices.

14. The distribution method according to claim 11, wherein if the selected relay-capable server devices are found to have been selected already as relay-determined server devices for at least some of the creative data of the play list, then said play list creating step selects the relay-capable server devices as relay-determined server devices for that creative data and sets said acquisition destination data for the same relay-determined service devices even though said play list creating step selects other relay-capable server devices as relay-determined server devices for other creative data of the play list.

15. The distribution method according to claim 9, wherein said play list creating step checks said super relay server devices for load levels upon start of distribution of said creative data and, if the load of said super relay server devices is found to have been equal to or exceeded a predetermined level, then sets said acquisition destination data of said creative data for an own device and schedules said creative data to be distributed directly.

16. The distribution method according to claim 9, wherein if said normal relay server devices are incapable of acquiring said creative data from said super relay server devices, then said play list creating step sets said acquisition destination data of said creative data for an own device and schedules said creative data to be distributed directly.

17. A processor encoded with a computer program for causing a distribution server device to perform a distribution method for distributing creative data to display terminal devices via relay server devices so that said display terminal devices may reproduce said creative data, wherein said relay server devices include normal relay server devices and super relay server devices, said normal relay server devices distributing said creative data to said display terminal devices and incapable of relaying said creative data to the other relay server devices, said super relay server devices distributing said creative data to said display terminal devices and to the other relay server devices; said distribution method comprising:

creating at least a play list for a given one of said display terminal devices, the play list including reproduction start times of said creative data of that play list and acquisition destination data indicating acquisition destinations of said creative data of that play list, the acquisition destinations being selected from the group consisting of said distribution device, said super relay server devices, and said normal relay server devices; and transmitting said play list and said creative data to said display terminal devices via said normal relay server devices and said super relay server devices;

wherein said play list creating step creates said play list by determining said acquisition destination data such that said creative data is distributed preferentially to said super relay server devices rather than to said normal relay server devices and said super relay server devices then distribute said creative data said normal relay server devices, and when said reproduction start times of said creative data in the play list for the given one of said display terminal devices fall below a predetermined time, said play list creating step sets said acquisition destination data of said creative data for said distribution device and schedules said creative data to be distributed directly from said distribution device to the given display terminal device.

* * * * *